(12) United States Patent
Kim (10) Patent No.: US 7,737,954 B2
(45) Date of Patent: Jun. 15, 2010

(54) POINTING DEVICE FOR A TERMINAL HAVING A TOUCH SCREEN AND METHOD FOR USING THE SAME

(75) Inventor: Seon-Mi Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 838 days.

(21) Appl. No.: 10/948,044

(22) Filed: Sep. 23, 2004

(65) Prior Publication Data

US 2005/0190147 A1 Sep. 1, 2005

(30) Foreign Application Priority Data

Feb. 27, 2004 (KR) .................. 10-2004-0013491

(51) Int. Cl.
*G06F 3/041* (2006.01)
(52) U.S. Cl. .................................... 345/173
(58) Field of Classification Search ................ 345/173, 345/157, 160, 681; 273/143; 178/18.01, 178/18.09
See application file for complete search history.

(56) References Cited

U.S. PATENT DOCUMENTS

| | | | | |
|---|---|---|---|---|
| 5,793,360 A | * | 8/1998 | Fleck et al. | 345/179 |
| 6,278,443 B1 | * | 8/2001 | Amro et al. | 345/173 |
| 7,154,480 B2 | * | 12/2006 | Iesaka | 345/173 |
| 2002/0122029 A1 | * | 9/2002 | Murphy | 345/173 |
| 2003/0179189 A1 | * | 9/2003 | Lira | 345/173 |
| 2004/0088727 A1 | * | 5/2004 | Kamiya | 725/52 |
| 2005/0056996 A1 | * | 3/2005 | Nordman | 273/143 R |

FOREIGN PATENT DOCUMENTS

JP 10-254675 * 9/1998

* cited by examiner

*Primary Examiner*—Richard Hjerpe
*Assistant Examiner*—Shaheda A Abdin
(74) *Attorney, Agent, or Firm*—The Farrell Law Firm, LLP (57) ABSTRACT

A device and a method are disclosed for providing a pointer for a terminal with a touch screen, which can easily select an intended item displayed on the touch screen by accurately pointing to the intended item through the pointer displayed on a screen when a pointer activating mode is selected by a user and performing an operation according to the selected item so that input errors are reduced by allowing a user to provide accurate input.

24 Claims, 9 Drawing Sheets

POINTING DEVICE FOR A TERMINAL HAVING A TOUCH SCREEN AND METHOD FOR USING THE SAME

PRIORITY

This application claims priority to an application entitled "Pointing Device Used for Terminal Having Touch Screen and Method for Using the Same" filed in the Korean Intellectual Property Office on Feb. 27, 2004 and assigned Ser. No. 2004-0013491, the contents of which are hereby incorporated by reference.

BACKGROUND OF THE INVENTION

1. Field of the Invention

The present invention relates to a pointing device, and more particularly to a pointing device used for a terminal having a touch screen and a method for using the same.

2. Description of the Related Art

Among conventional methods for inputting letters in a mobile terminal using a touch screen, a soft keyboard method refers to a method of inputting letters by displaying an input window in the form of a keyboard on a touch screen. Pen-clicks may be inputted thereon in order to solve a problem relating to portability of a keyboard and a mouse of a mobile terminal. Currently, such touch screens have been used for various terminals, such as cellular phones, smart phones, automatic teller machines (ATMs), palm PCs, personal digital assistants (PDAs), etc., as input apparatuses. In particular, examples of mobile terminals having such touch screens are electronic notebooks, cellular phones, PDAs, etc.

Conventionally, a touch screen provides an interface allowing a user to input a command and information to a terminal by touching a finger or a stylus pen to an icon displayed on the touch screen, mobile terminals have become smaller having light weight, so these touch screens must be miniaturized with light weight corresponding to that of the mobile terminals. Accordingly, mobile terminals such as a PDA, etc., provide a user interface through an image on a touch screen as a substitute for a keyboard. If necessary, a stylus pen may be used to activate the keyboard.

Figure 1:
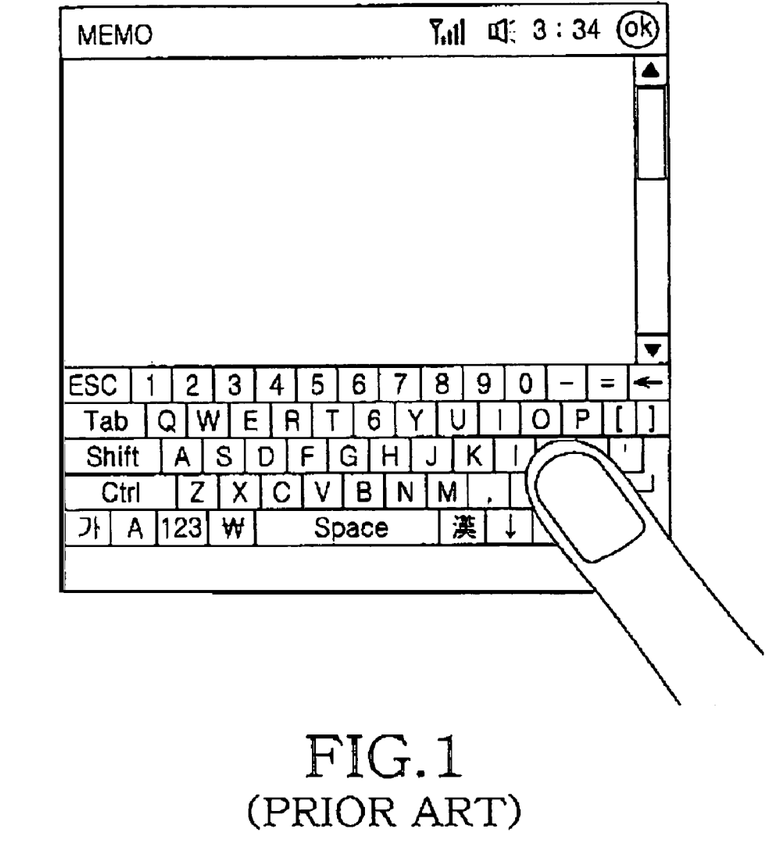
FIG. 1 is a screen image used in a conventional soft keyboard input method.

A soft keyboard on a screen is displayed as shown in FIG. 1 in order to input letters on a touch screen miniaturized as described above. FIG. 1 shows a screen used according to a conventional soft keyboard input method. In the soft keyboard input method, since all keys of a keyboard must be displayed on a screen of a mobile terminal, an area assigned for each key button is very small. For example, in a PDA having a screen of 3.5 inches, an area of each key button is about 4×4 mm. Also, in currently-used mobile terminals, all keys for inputting letters are displayed on a miniaturized touch screen as a soft keyboard.

Therefore, a screen for displaying a keyboard for inputting letters must be larger. Consequently, the size of a section for displaying outputted letters must be reduced. Also, since all icons having various functions must be displayed on the same screen, the size of a section for displaying each icon is reduced. Accordingly, an assistance tool can be required in order to input letters or select icons displayed on a screen. The assistance tool may include a stylus in the form of a writing instrument having a sharpened tip part. A user can carry the stylus or the stylus can be fixed on a rear side of a terminal body to allow the user to easily locate and use the stylus.

However, currently-used touch screens are very small and have very slippery surfaces. Therefore, when using a stylus pen on a touch screen, unintended commands may be executed due to the stylus slipping to an unintended command or selection on the slippery surface of the touch screen. Accordingly, inconvenience may occur in that a user must re-input an intended command. In other words, when performing an operation requiring accurate pointing through a mobile terminal having a touch screen, it is difficult to accurately select intended icons or letters without using assistance tools such as a stylus, etc.

As described above, conventionally, when a user inputs letters, etc., through a touch screen by using a finger without using an assistance tool such as a stylus, since the user presses small buttons of a keyboard displayed on a miniaturized touch screen, the user may mistakenly press unintended buttons next to intended buttons. Accordingly, inconvenience is incurred, in that the intended buttons must be re-inputted. That is, if an area of a finger touching a touch screen is wider than areas of displayed icons, etc., it is impossible to accurately point to the displayed icons. Accordingly, problems are incurred, in that unintended icons being frequently inputted.

Accordingly, if a user is not using a stylus, the user must use his/her finger to touch a screen by repeatedly performing trial and error until an intended operation is achieved. Also, if the user performs an operation by frequently using assistance tools such as an automatic pencil, etc., a problem is incurred in that a surface of a screen may be damaged.

SUMMARY OF THE INVENTION

Accordingly, the present invention has been made to solve the above-mentioned problems occurring in the prior art, and an object of the present invention is to provide a pointing device used for a terminal having a touch screen and a method using the same, which allow a user to accurately point to letters or icons located in predetermined positions using the user's finger without using assistance tools on a touch screen.

To accomplish this object, there is provided a pointing device used for a terminal having a touch screen, the pointing device including a control part for displaying a pointer on the touch screen if a pointer activating mode for displaying the pointer pointing to an item on the touch screen is selected by a user; and a user interface for outputting an input signal to the control part if a pen stroke is inputted from the user by means of the pointer, wherein the control part is operated based on an item pointed by the pointer if the control part receives an input signal through the pointer from the user interface.

To accomplish this object, there is also provided a method for utilizing a pointing device used for a terminal having a touch screen, the method including the steps of: displaying a pointer on the touch screen if a pointer activating mode for displaying the pointer pointing to an item on the touch screen is selected by a user; and performing an operation according to an item pointed by the pointer if a pen stroke is inputted from a user by means of the pointer.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention rather unclear.

Hereinafter, according to the present invention, a method of accurately and conveniently pointing to items, such as letters, icons, buttons, checkboxes, and sliders, displayed on a screen without using pointing devices will be described with reference to accompanying drawings. According to the present invention, a mobile terminal shown in FIG. 2 (hereinafter, referred to as "terminal") including a touch screen 210 has a basic mode for providing an interface through an input device (e.g., a pointing device), such as a stylus and a pointer activating mode allowing a user to point to items by handling a pointer displayed on a display part 210 by means of the user's finger.

Figure 2:
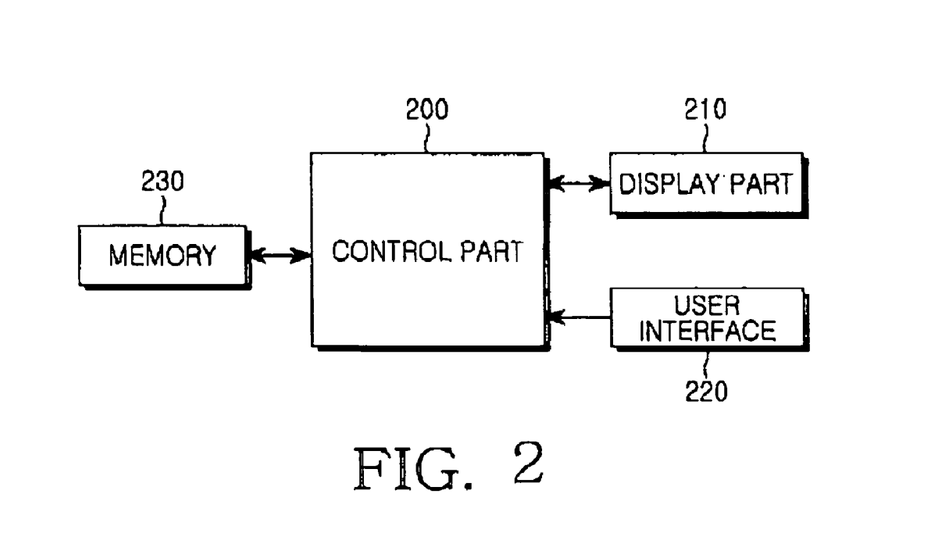
FIG. 2 is a block diagram of a mobile terminal according to the present invention.

First, FIG. 2 is a block diagram of the terminal having a touch screen according to the present invention. As shown in FIG. 2, the main parts included in the terminal having a touch screen according to the present invention are a control part 200, a display part 210, a user interface 220, and a memory 230.

Figure 3A:
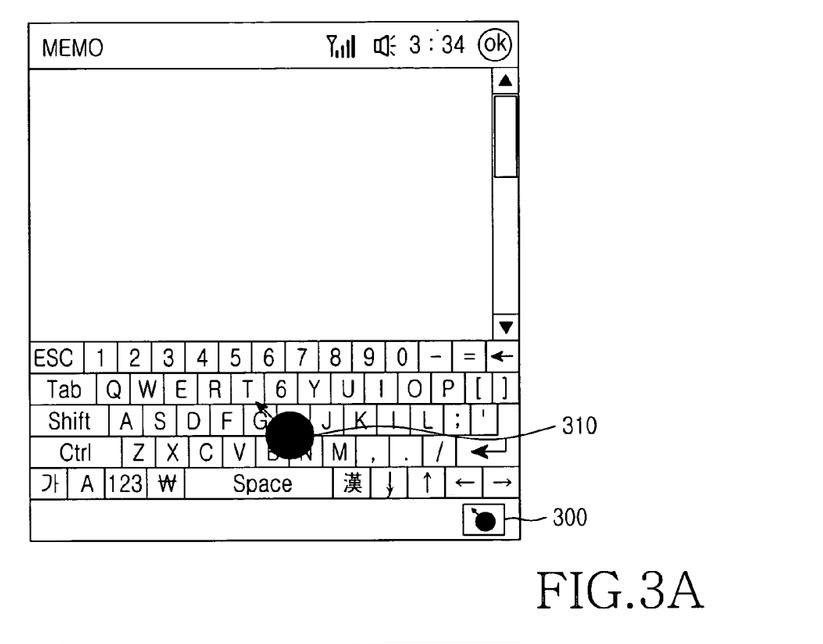
FIGS. 3a to 3c are screen images illustrating a pointer of a mobile terminal, which is activated according to one embodiment of the present invention.
Figure 4A:
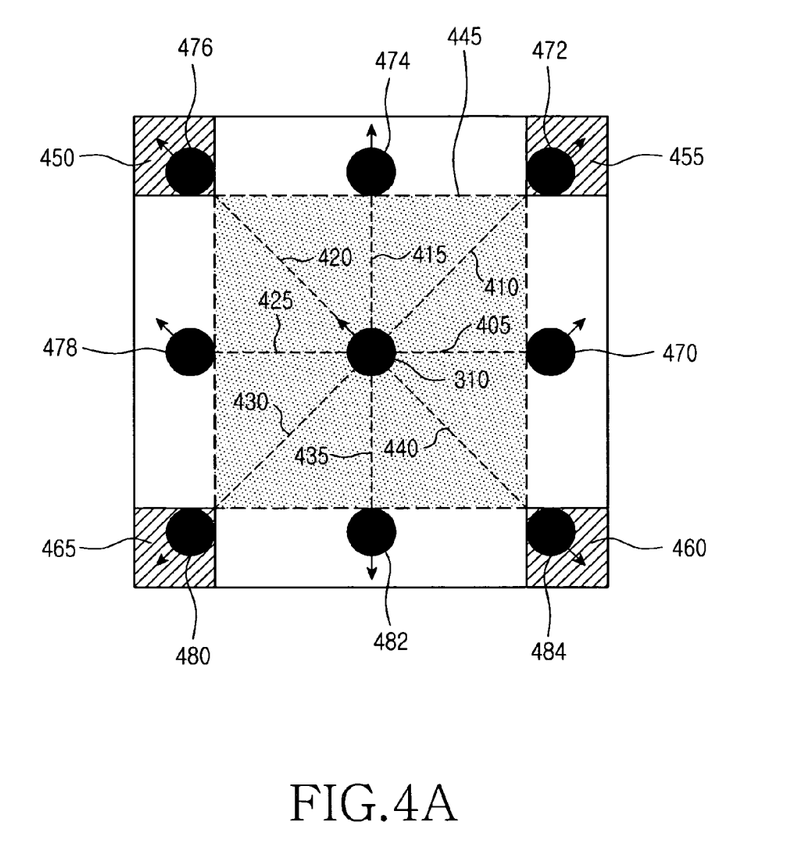
FIG. 4a is a diagram showing arrow directions of a pointer depending on drag directions of the pointer according to one embodiment the present invention.
Figure 4B:
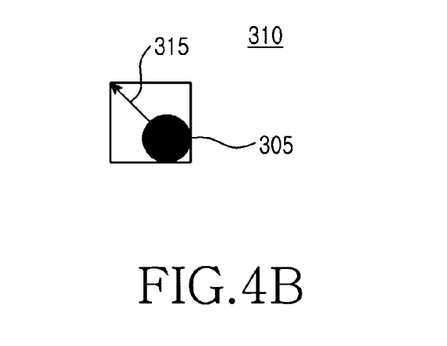
FIG. 4b is a diagram showing a pointer according to one embodiment of the present invention.

First, the control part 200 controls the basic mode and the pointer-activating mode in such a manner that the basic mode and the pointer mode are alternately switched depending on activation of a pointing function by a user. Herein, as shown in FIG. 3a, the pointing function may be activated through a key provided in a key pad as a part of the terminal or through a soft key 300 embodied through software. If a user inputs a key in order to activate the pointing function, the control part 200 (FIG. 2) according to one embodiment of the present invention displays a pointer 310 on a predetermined position as shown in FIG. 4b. In contrast, according to another embodiment of the present invention, the control part 200 maintains a waiting mode until a user performs touch input. When the user performs touch input on a touch screen in the waiting mode, that is, when the user performs a pen-down operation, the control part 200 displays the pointer 310 at a position at which the pen-down operation is achieved.

Referring to FIG. 4b, the pointer 310 includes a touch part 305 for making contact with a user's finger and an arrow 315 having a predetermined length, which allows a user to point to the items. Herein, the arrow 315 having a predetermined length indicates a predetermined direction in order to more accurately point to the display items. According to the present invention, pointers having various shapes may be provided in order to meet various user requirements and preferences.

Figure 3B:
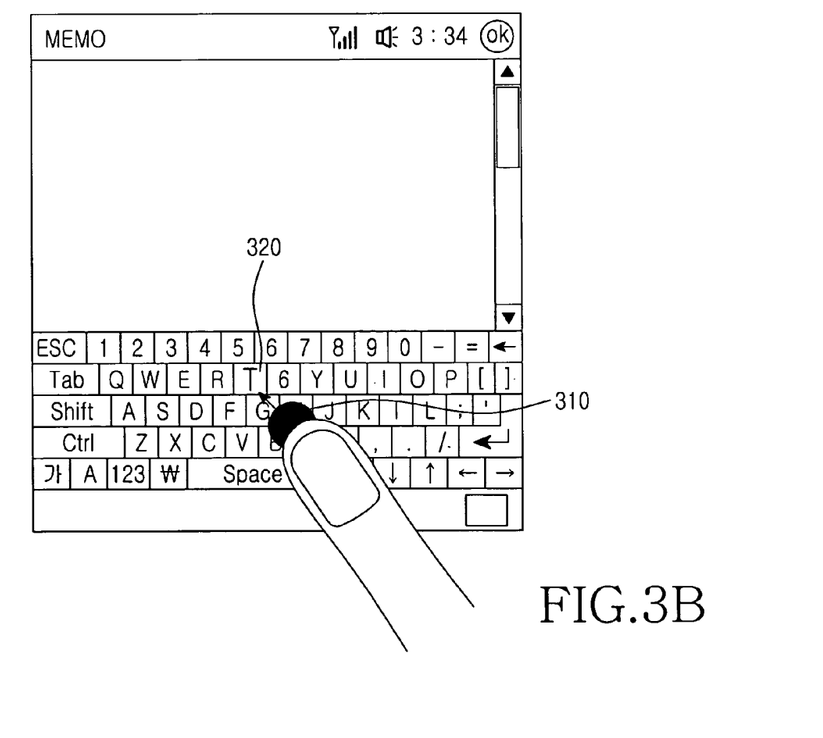

A method for using the pointer described above will be described in detail with reference to FIGS. 3b and 3c. First, when a user selects the pointer activating mode, that is, the pointing function, the pointer 310 is displayed on a touch screen. As shown in FIG. 3b, if a user wants to input a letter 'T', the user drags the pointer 310 to point to a position 320 of the 'T' letter while touching the touch part 305 (FIG. 4b) of the pointer 310. Thereafter, if the arrow 315 (FIG. 4b) is located at the position 320, the user takes the finger off the touch part 305. The control part 200 (FIG. 2) recognizes the moment in which the user takes the finger off the touch part 305 as input time and displays the 'T' letter corresponding to a position pointed to when the user takes the finger off the display part 210 (FIG. 2).

However, it is difficult for the pointer 310, represented as an arrow indicating a predetermined direction (e.g., the direction of 11 o'clock) shown in FIG. 3b, to point to an item positioned at a left edge. Accordingly, on the assumption that a user continuously drags the pointer 310 to a left direction, if the arrow of the pointer 310 maintains only one direction, the user's finger may go beyond the touch screen. To prevent the user's finger from going beyond the touch screen, according to the present invention, a specific area on the touch screen is set as a threshold area. If the pointer 310 is beyond the threshold area, an arrow direction of the pointer 310 may be changed as shown in FIG. 3c. Herein, the threshold area is a reference area for changing the arrow direction of the pointer 310 in order to perform much more precise pointing.

Figure 3C:
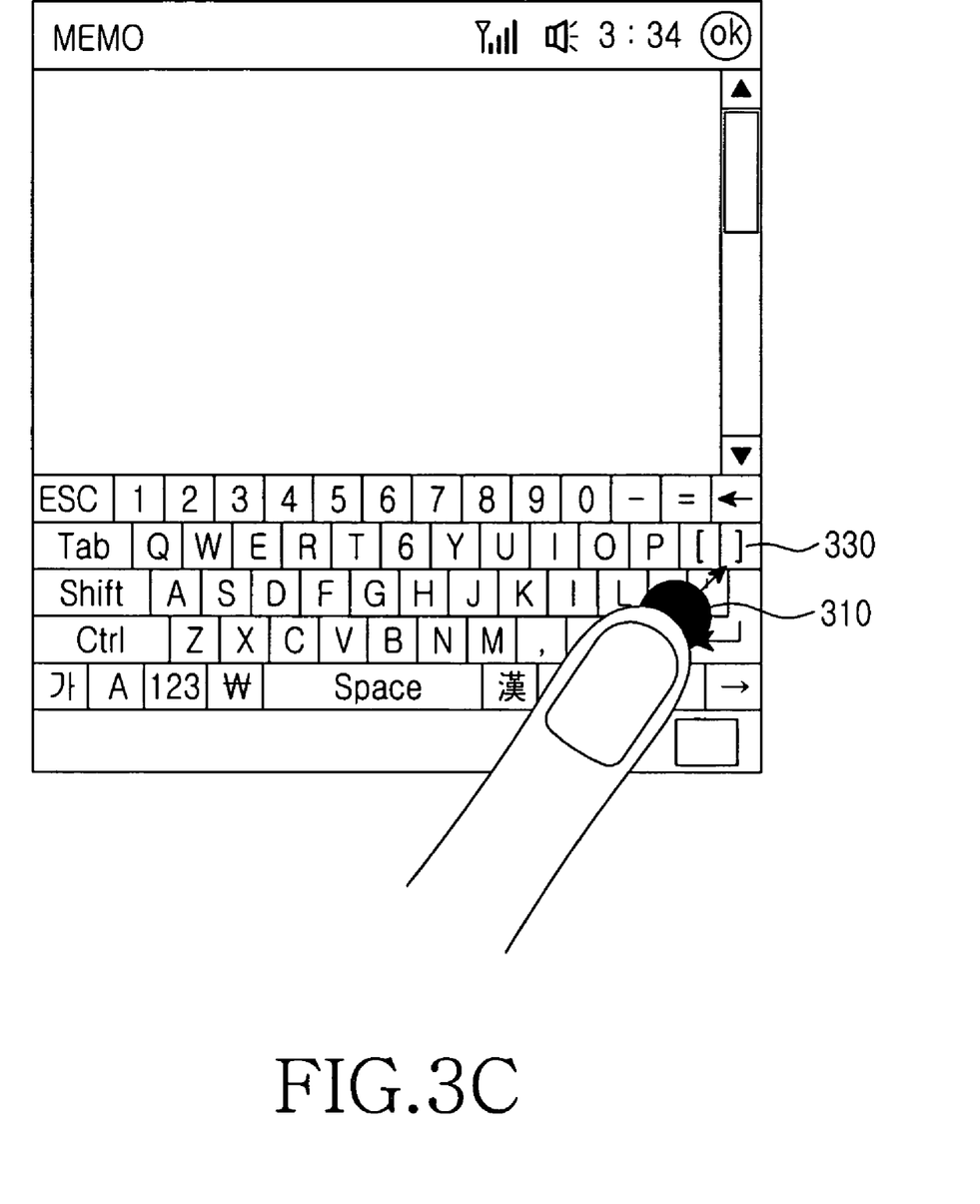

Referring to FIG. 3c, according to the present invention, to input a symbol ']', it is unnecessary for the user to drag the pointer 310 to a left end of a touch screen, and the arrow direction of the pointer 310 is changed as shown in FIG. 3c right before the touch part 305 (FIG. 4b) of the dragged pointer 310 moves out of the touch screen to which the pointer 310 is dragged. In other words, if the dragged pointer 310 reaches the threshold area, the arrow direction of the pointer 310 is changed from the direction of 11 o'clock to the direction of 1 o'clock and is displayed. As described above, since the arrow of the pointer 310 is changed, a user can accurately and conveniently point to intended items at the edge of the display.

Referring to FIGS. 2 and 4b, according to another embodiment of the present invention, when a user performs only touch input in the pointer activating mode, the control part 200 displays the pointer 310 at a position of the user's finger. Thereafter, when the pointer 310 is positioned at an intended item, if a user performs a pen-up operation for the pointer 310, that is, the user takes the finger off the touch part 305 of the pointer 310, the control part 200 detects that the intended item is selected. Then, the control part 200 erases the displayed pointer from a screen as soon as the user performs the pen-up operation and performs an operation corresponding to a selected item.

If the user interface 220 receives a pen-stroke input from the user, the user interface 220 outputs an input signal to the control part 200. Herein, according to the present invention, the user interface 220 is a touch screen. The control part 200 determines the form of an input by using a signal inputted through the user interface 220. The control part 200 determines whether the form of the input is pen-click or pen-drag. Herein, the pen-click according to the present invention refers to an operation that a user takes the finger off the touch part 305 right after the user presses the touch part 305 of the pointer 310, at which the user's finger is positioned. That is, the pen-click refers to an operation that the pen-up operation is achieved right after performing a pen-down operation for the touch part 305 of the pointer 310 by using the user's finger. The pen-drag refers to an operation that a user moves the pointer 310 while touching the user's finger to the touch part 305 of the pointer 310. That is, the pen-drag refers to an operation that the user drags the pointer 310 while performing the pen-down operation for the touch part 305 of the pointer 310 with the user's finger. Thereafter, the user can select an intended item by performing the pen-up operation for the intended item if the pointer 310 is positioned at the intended item after dragging the pointer 310 while performing the pen-down operation.

Also, the memory 230 connected to the control part 200 includes a read only memory (ROM), a random access memory (RAM), and a voice memory for storing a plurality of programs and information required when controlling an operation of the terminal. The memory 230 according to the present invention has software capable of tracking movement of a pointer on a screen. Also, the memory 230 stores a plurality of pointers having various shapes in addition to a plurality of pointers having arrows indicating mutually different directions according to the present invention.

Hereinafter, a procedure of pointing items such as a soft keyboard displayed as shown in FIGS. 3a to 3c will be described with reference to FIGS. 4a and 4b. FIG. 4a shows arrow directions of pointers depending on drag directions of the pointers according to the present invention. Items, such as letters, icons, buttons, checkboxes, and sliders in addition to the soft keyboard can be displayed on the display part 210 according to the present invention. However, the items are not shown in FIG. 4a in order to describe in detail the arrow directions of the pointers changed according to the drag directions of the pointers.

First, referring to FIG. 4a, a screen, which is an area for displaying an item, is divided into three parts. That is, the screen is largely divided into a center square area 445, corner square areas 450, 455, 460, and 465, and remaining areas. First, the center square area 445 is created at the center of the screen by connecting upper, lower, right, and left critical points virtually existing on the screen to each other. Herein, the critical points are points obtained by subtracting the size of the pointer 310 from the size of the entire screen. Herein, in order to describe the critical points in detail, description the size of the pointer 310 will be given with reference to FIG. 4b. As shown in FIG. 4b, in order to calculate coordinates of the pointer 310 the size of the pointer 310 including the arrow 315 and the touch part 305 is calculated on the assumption that the shape of the pointer 310 is a regular square.

Hereinafter, areas divided by critical points will be described. On the assumption that the pointer 310 has a shape of a regular square measured by 15 units in both length and breadth and the size of the entire screen is measured by 100 units and 150 units in breadth and length, respectively, right and left critical points may be positioned at points which are located remote from both transverse sides of the screen by a distance measured by 15 units. Herein, the above described numeral values have no specific unit, because they are simply used for explaining the ratio of the size of the pointer to the size of the entire screen. Also, upper and lower critical points may be positioned at points, which are located remote from both longitudinal sides of the screen by a distance measured by 15. If the upper, lower, left, and right critical points are connected to each other, the center square area 445 measured by 70 units and 120 units in breadth and length is defined. Although the above description has been provided with a specific numerical value, the size of the center square area 445 of the present invention may be adjustable.

Also, the corner square areas 450, 455, 460, and 465 make contact with each vertex of the center square section 445 and each vertex of the entire screen, respectively, while being formed at each corner of the entire screen with sizes larger than a size of the pointer 310. For example, the corner square areas 450, 455, 460, and 465 can be formed lager than a size of 15 mm in breadth and length. In addition, the remaining areas signify parts of the entire screen in which the center square area and the corner square area are omitted.

Areas shown in FIG. 4a are divided through a method described above. A direction indicated by the arrow of the pointer 310 is changed according to areas at which the pointer 310 is positioned. Hereinafter, a direction of the arrow 315 of the pointer 310 varied depending on a direction of the pointer 310 dragged will be described according to one embodiment of the present invention. If, when a user drags the pointer 310 along a direction indicated by reference number 405, the control part 200 detects that the pointer 310 enters into the remaining areas after moving out of the center square area 445, the control part 200 changes an arrow direction of the pointer 310 into an arrow direction of a pointer 470 and displays the pointer 470 on the display part 210. That is, if the pointer 310 enters into the remaining areas after moving out of the center square area while a user is dragging the pointer 310 with pressing the finger touch part 305 of the pointer 310, a direction indicated the arrow of the pointer 310 is immediately changed into a side direction and displayed on the display part 210. Accordingly, if a user lifts the finger off the pointer 470 when the arrow of the pointer 470 is positioned at an item intended by the user after the pointer 310 is changed into the pointer 470, the item positioned at the edge of the screen can be accurately selected.

Also, if a pen-drag input occurs along a direction indicated by reference number 425, the control part 200 detects whether the pointer 310 has moved out of the center square area 445. At that time, if the pointer 310 has moved out of the center square area 445 and entered into the remaining areas while a user is dragging the pointer 310 along the direction indicated by reference number 425, the control part 200 displays a pointer 478 having an arrow direction identical to the arrow direction of the pointer 310. Herein, the arrow direction of the pointer 310 is maintained in the arrow direction of the pointer 478 because it is possible to perform accurate pointing since the arrow direction of the pointer 310 has been already in a side direction even though the arrow direction of the pointer 310 is not changed when dragging the pointer 310 along the direction indicated by reference number 425. For this reason, when the pointer 310 moves out of the center square area 445 and enters into the corner square area 450 while a user is dragging the pointer 310 along a direction indicated by reference number 420, the arrow direction of the pointer 310 is maintained in an arrow direction of a pointer 476.

When a user drags the pointer 310 along a direction indicated by reference number 415 while pressing the finger touch part 305 of the pointer 310, the control part 200 detects whether the pointer 310 exists the remaining areas after moving out of the center square area 445. If the pointer 310 enters into the remaining area after moving out of the center square area 445, the control part 200 changes from the pointer 310 into a pointer 474 and displays the pointer 474. That is, if the pointer 310 has moved out of the center square area 445 while dragging the pointer 310 along a direction indicated by reference number 415, the arrow direction of the pointer 310 indicates the upward direction. Similarly, if the pointer 310 has moved out of the center square area 445 while dragging the pointer 310 along a direction indicated by reference number 435, the pointer 310 is changed into a pointer 482 indicating the downward direction and displayed on the display part 210.

In addition, while a user is dragging the pointer 310 along a direction indicated by reference number 410, the control part 200 detects whether the pointer 310 enters into the corner square area 455 after moving out of the center square area 445. If the control part 200 determines that the pointer 310 has been entered the corner square area 455 as a result of the detection, the control part 200 changes the arrow direction of the pointer 310 into an upward corner direction. That is, if the pointer 310 reaches the corner square area 455 while dragging the pointer 310 along a direction indicated by reference number 410, the control part 200 changes the pointer 310 into a pointer 472 having an arrow indicating a corner direction and displays the pointer 472 on the display part 210. Similarly, if the control part 200 detects that the pointer 310 has moved out of the center square area 445 while dragging the pointer 310 along a direction indicated by reference number 440 by a user. If the control part 200 detects that the pointer 310 enters into the corner square area 460 after moving out of the center square area 445 when the pointer 310 is dragged, the control part 200 changes the pointer 310 into a downward right corner direction and displays a pointer 484. Likewise, if the pointer 310 is dragged along to a direction indicated by reference number 430 so as to enter into a corner square area 465, the control part 200 changes the pointer 310 into a pointer 480 having an arrow indicating a downward left corner direction and displays the pointer 480 on the display part 210.

Figure 5:
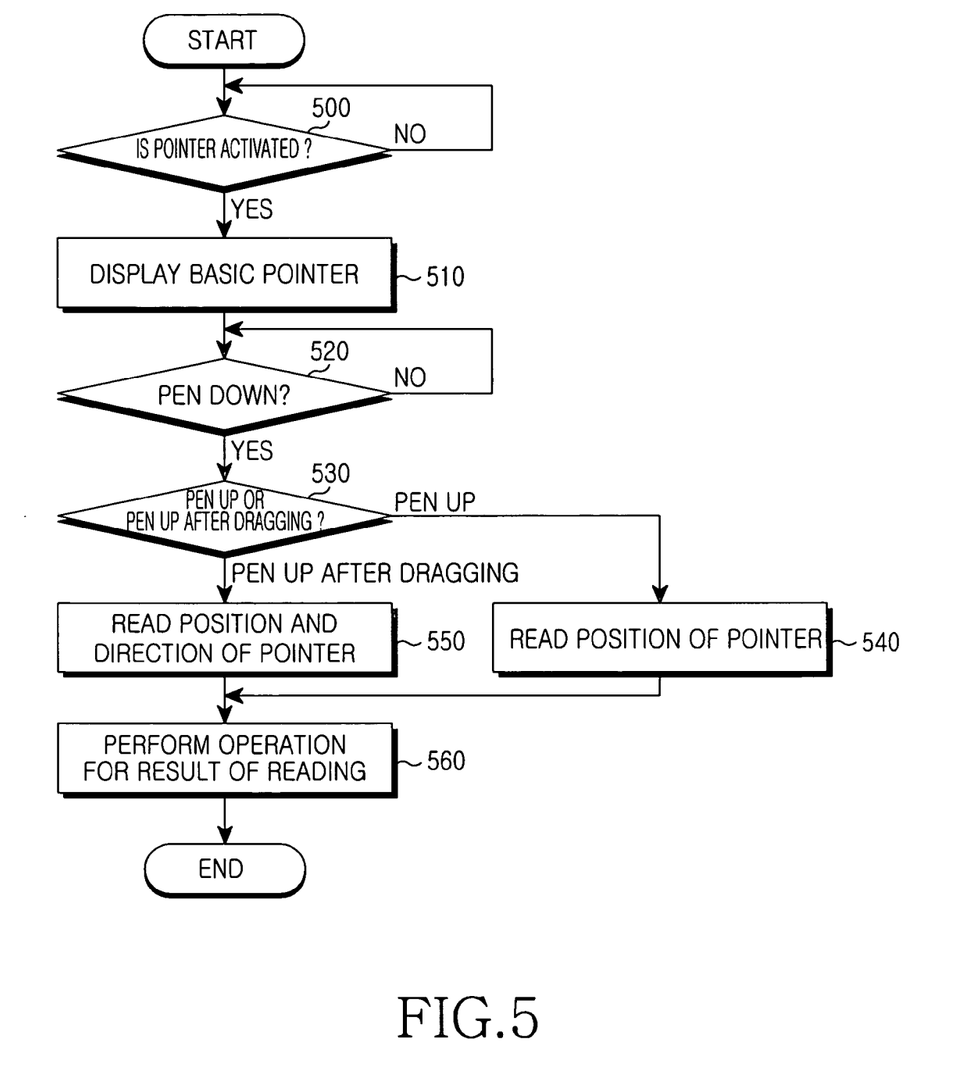
FIG. 5 is a flowchart showing a procedure for controlling a pointer in a pointer activating mode according to one embodiment of the present invention.

A procedure of inputting an item by pointing to the item will now be described with reference to FIG. 5. FIG. 5 is a flow chart for controlling the pointer activating mode according to one embodiment of the present invention.

In step 500 the control part 200 determines whether an input of a user for activating the pointer function exists. If a pointer activation is selected, the control part 200 enters the pointer activating mode in step 510 by displaying the basic pointer 310 on the display part 210. Herein, the basic pointer 310 refers to a pointer having an arrow indicating a left corner direction shown in FIG. 4b.

If the pointer 310 is displayed, the control part 200 determines whether the pen-down operation is carried out by the user in step 520. That is, the control part 200 determines if the user pressed the finger touch part 305 of the pointer 310. If the pen-down operation is performed, in step 530 the control part 200 determines whether the pen-up operation is achieved by the user right after the pen-down operation or whether the pen-up operation is achieved after the pointer 310 is dragged in a pen-down state by the user. If the pen-up operation is achieved right after the pen-down operation, the control part 200 reads a position of the pointer 310 displayed on an area in which the pen-up operation is achieved in step 540.

If the pen-up operation is achieved after the pointer 310 is dragged in the pen-down state, the control part 200 reads a position of an area in which the pen-up operation is achieved after the pointer 310 is dragged and an arrow direction of the pointer 310 in step 550. Thereafter, the control part 200 carries out an operation according to a result of the reading in step 560.

Figure 6:
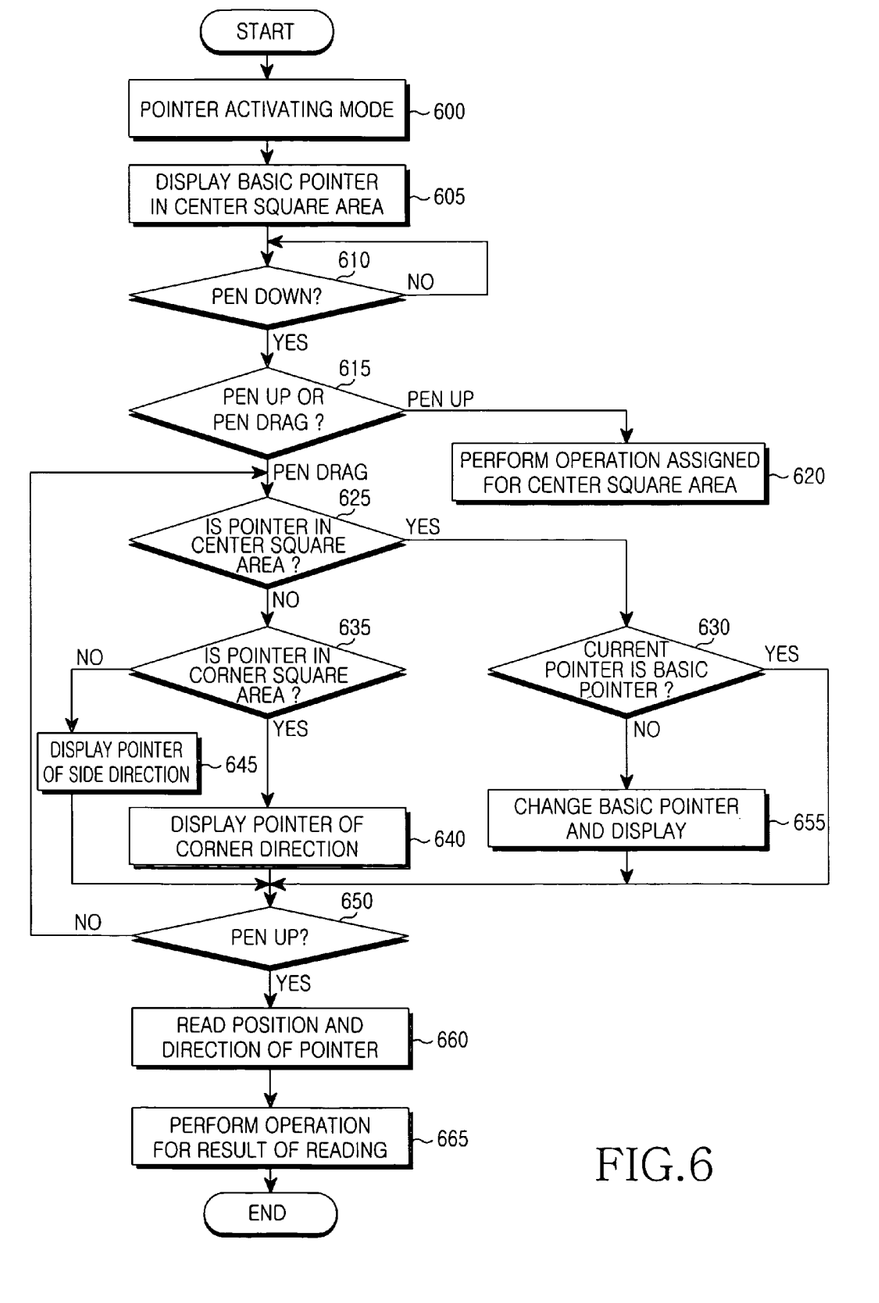
FIG. 6 is a flowchart explaining a procedure shown in FIG. 5 in detail.

A more detailed description of this will not be given with reference to FIG. 6, which is a detailed flowchart of FIG. 5.

Referring to FIG. 6, if a user selects a point function, the control part 200 becomes the pointer activating mode in step 600. Thereafter, the control part 200 displays a basic pointer in the center square area according to the pointer activating mode in step 605. In other words, if the pointer activating mode for displaying a pointer pointing to an item on the touch screen is selected by the user, a control part displays the basic pointer on the touch screen.

Then, in step 610 the control part 200 determines whether the user touches the finger to a touch part of a pointer, that is, whether the pen-down operation occurs. If the pen-down operation has occurred, the control part 200 determines in step 615 whether the pen-up operation is achieved by the user right after the pen-down operation or whether the pen-drag is achieved by the user in a pen-down state.

If the pen-up operation is achieved right after the pen-down operation, in step 620 the control part 200 carries out an operation assigned for the center square area. In other words, the control part 200 performs an operation corresponding to an item pointed by a pointer positioned at the center square area when the pen-up operation is achieved. Such an operation is performed by displaying various mark data based on a pointing input for an item through the user interface 220. For example, if an item pointed to by a pointer is a letter, the control part 200 recognizes that the pen-up operation performed just after the pen-down operation is for the purpose of inputting the letters, so the control part 200 displays various letters on the display part 210.

If a pen-drag operation is performed in a pen-down state in step 615, the control part 200 proceeds to step 625. It determines in step 625 whether a dragged pointer is in the center square area. If the pointer dragged is in the center square area, in step 630 the control part 200 determines whether a currently-dragged pointer is a basic pointer. If the currently-dragged pointer is the basic pointer, the control part 200 performs step 650.

If the control part 200 determines in step 625 that the pointer dragged by the user has moved out of the center square area, it then determines in step 635 whether the dragged pointer enters into a corner square area. If it is determined that the dragged pointer entered into a corner square area, in step 640 the control part 200 changes a pointer having an arrow indicating a predetermine direction into a pointer having an arrow indicating a corner direction in order to perform precise pointing and displays it. Otherwise, if a pointer has moved out of the center square area and enters into the remaining areas, in step 645 the control part 200 changes the pointer having an arrow indicating a predetermined direction into a pointer having an arrow indicating a side direction and displays it.

As described above, a user can take the finger off a touch part of a dragged pointer when positioning a pointer having an arrow indicating a changed direction, in order to perform precise pointing operation with respect to a desired item. Herein, in step 650 the control part 200 determines whether the user takes the finger off the touch part of the dragged pointer, that is, whether the pen-up operation is achieved. If the pen-up operation is achieved for the dragged pointer, the control part 200 performs step 660. If the pointer is continuously dragged, the control part 200 returns to step 625.

As described above, if the pointer is continuously dragged by a user, the control part 200 determines whether the pointer re-enters into the center square area in step 625. If the pointer re-enters into the center square area, in step 630 the control part 200 determines whether a current pointer is it. If the current pointer is not the basic pointer, the control part 200 changes the current pointer into the basic pointer and displays the basic pointer by performing step 655. Herein, a pointer re-entering into the center square area after moving out of a corner square area has an arrow indicating a corner direction.

Accordingly, the control part 200 changes the pointer having the arrow indicating a corner direction into the basic pointer having an arrow indicating a predetermined direction and displays the basic pointer. Similarly, a pointer re-entering into the center square area after moving out of the remaining areas has an arrow indicating a side direction. Therefore, the control part 200 changes the pointer having the arrow indicating the side direction into the basic pointer having the arrow indicating a predetermined direction and displays the basic pointer.

Regarding the above description in detail, if a user wants to point to an intended item with precision, the user can drag a pointer while touching the finger to a touch part of the pointer displayed on a screen. As described above, when the pointer is dragged by the user, an arrow direction of the pointer is varied depending on an area at which the pointer is positioned and displayed. If the pointer has moved out of the center square area and is positioned at any one of corner areas between the entire screen and a square area having a predetermined size when the pointer is dragged by the user, the arrow direction of the pointer is changed into a direction of a corner at which the pointer is positioned and displayed. Accordingly, the user can conveniently select the intended display item.

The control part 200 can continuously and repeatedly perform the above described procedure until a user takes the finger off a touch part of a pointer in order to select the intended item. As described above, the control part 200 determines a position of the pointer dragged by the user, varies a direction indicated by an arrow of the pointer depending on an area at which the pointer is positioned, and displays the pointer in such a manner that a precise pointing is performed. Thereafter, when the user selects an intended item by positioning the pointer at the intended item, the control part 200 determines whether the pen-up operation is achieved for the dragged pointer in step 650. Then, the control part 200 determines that the pen-up operation is achieved and carries out step 660 so as to read a position and an arrow direction of the pointer in the pen-up operation. Then, the control part 200 carries out an operation corresponding to a result of the reading in step 665. That is, the control part 200 carries out an operation corresponding to an item pointed to the pointer.

As described above, the control part 200 regards time for performing an operation according to an item pointed by a pointer as time at which the user's finger is taken off a touch part of the pointer, so that a user can select an intended item. Various methods can be utilized in addition to the above described method. For example, a user can select an intended item by employing a method in which the user drags a pointer to a point at which the intended item is positioned while touching a touch part of the pointer by using the user's finger, takes the finger off the touch part of the pointer, and presses the touch part of the pointer once more.

In addition, a user can select an intended item by touching the touch part of the pointer for a predetermined period of time after dragging a pointer while touching the user's finger to a touch part of the pointer and separating the finger from the touch part of the pointer. Also, the user can drag the pointer again by touching the finger to the touch part of the pointer for a short time. Besides the above, a user can find that an intended item is selected according to a state of a pointer representing that color of the pointer is reversed or changed through a specific key installed in hardware according to another embodiment of the present invention.

Figure 7:
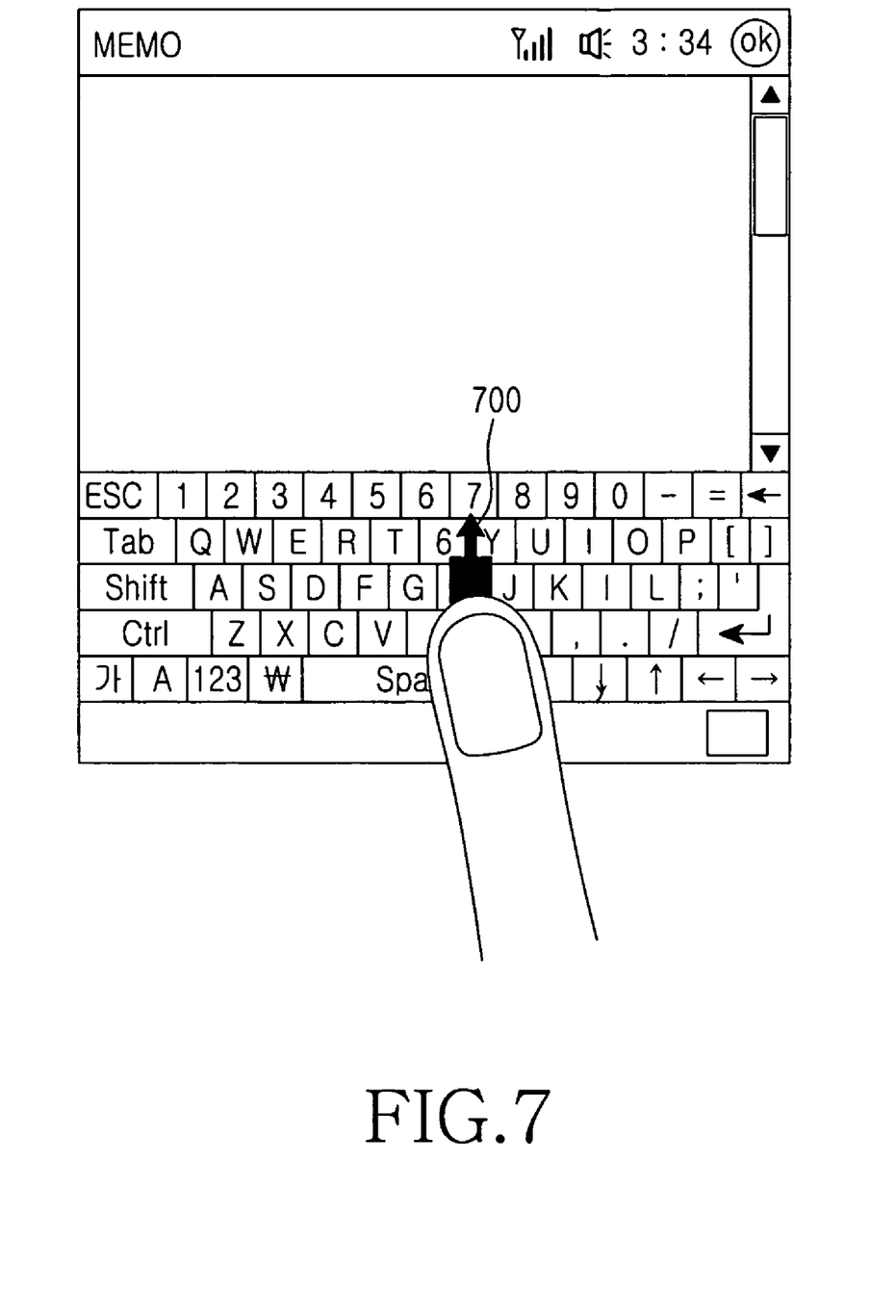
FIG. 7 is a screen image illustrating a pointer having an arrow in a fixed direction, which is activated according to another embodiment of the present invention.

Hereinafter, a procedure for pointing and inputting an item will be described with reference to FIG. 7. FIG. 7 illustrates a screen showing when activating a pointer having an arrow indicating a fixed direction according to another embodiment of the present invention and FIG. 8 illustrating a flow chart for controlling the pointer when utilizing the pointer having an arrow indicating a fixed direction according to another embodiment of the present invention.

Figure 8:
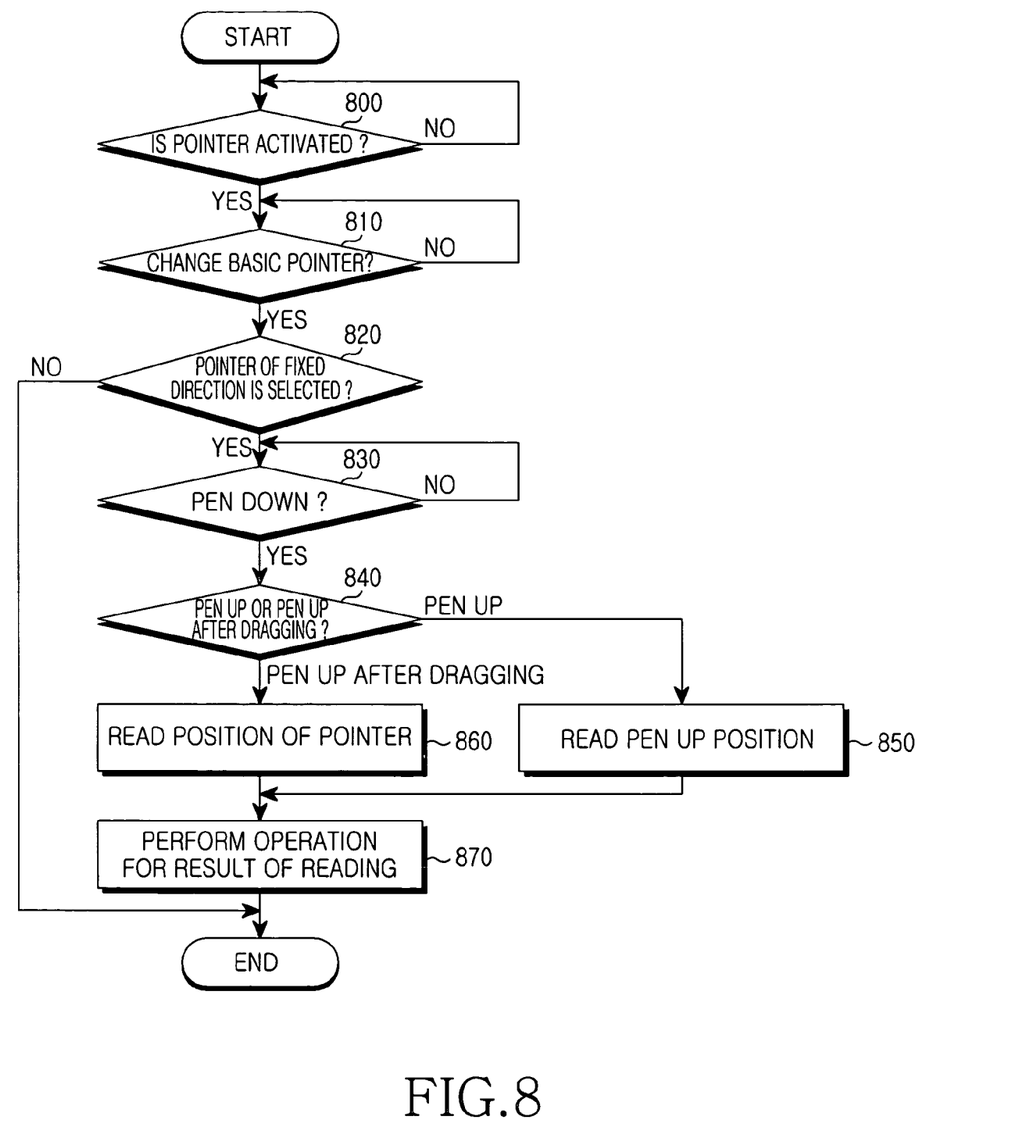
FIG. 8 is a flowchart showing a control procedure when a pointer having an arrow in a fixed direction is used according to another embodiment of the present invention.

According to the embodiment of the present invention illustrated in FIGS. 7 and 8, a user can select an intended item by pointing to the intended item through a pointer having an arrow indicating a predetermined direction regardless of an area at which the pointer is positioned. Such a pointer having the arrow indicating a predetermined direction is displayed as shown in FIG. 7. As shown in FIG. 7, a pointer 700 includes an arrow indicating a predetermined direction and a touch part touched by a user. For example, if a pointer having an arrow indicating the upper direction is displayed on a screen, a user can more easily and quickly select an intended item. Also, the present invention provides pointers having various shapes in order to meet various requirements and preferences of a user and allows the user to select the pointers according to the user's preference.

Hereinafter, a procedure of pointing and inputting an item by using a pointer having an arrow indicating a fixed direction as required by the user, which is modified from a pointer having an arrow indicating directions depending on an area at which the pointer is positioned, will be described.

Referring to FIG. 8, in step 800 the control part 200 determines whether a pointer activating mode for displaying a pointer pointing to an item displayed on a touch screen, that is, a screen is selected by a user. If the pointer activating mode is selected, in step 810 the control part 200 determines whether a menu for changing the shape of the pointer is selected by a user. If the control part 200 determines that the menu has been selected by a user, the control part 200 displays pointers having various shapes and receives any one of the pointers selected by a user.

If a shape of a pointer is changed by a user, in step 820 the control part 200 determines whether a selected pointer is a pointer having an arrow indicating a fixed direction. If a pointer having an arrow indicating a fixed direction has been selected, in step 830 the control part 200 determines whether a touch part of the pointer is touched by a user, that is, the pen-down operation is achieved for the pointer. Thereafter, if the control part 200 determines that the pen-down operation has been achieved, in step 840 the control part 200 determines whether the pen-up operation is achieved right after the pen-down operation or whether the pen-up operation is achieved after the pointer is dragged in a pen-down state.

If the pen-up operation is achieved right after the pen-down operation, in step 850 the control part 200 reads a pen-up position, that is, a position of the pointer when the pen-up operation is achieved. Otherwise, if the pen-up operation is achieved after the pointer is dragged in the pen-down state, in step 860 the control part 200 reads a position at which the pen-up operation occurs after the pointer is dragged by a user. Then, the control part 200 carries out an operation corresponding to a reading result in step 870.

Figure 9:
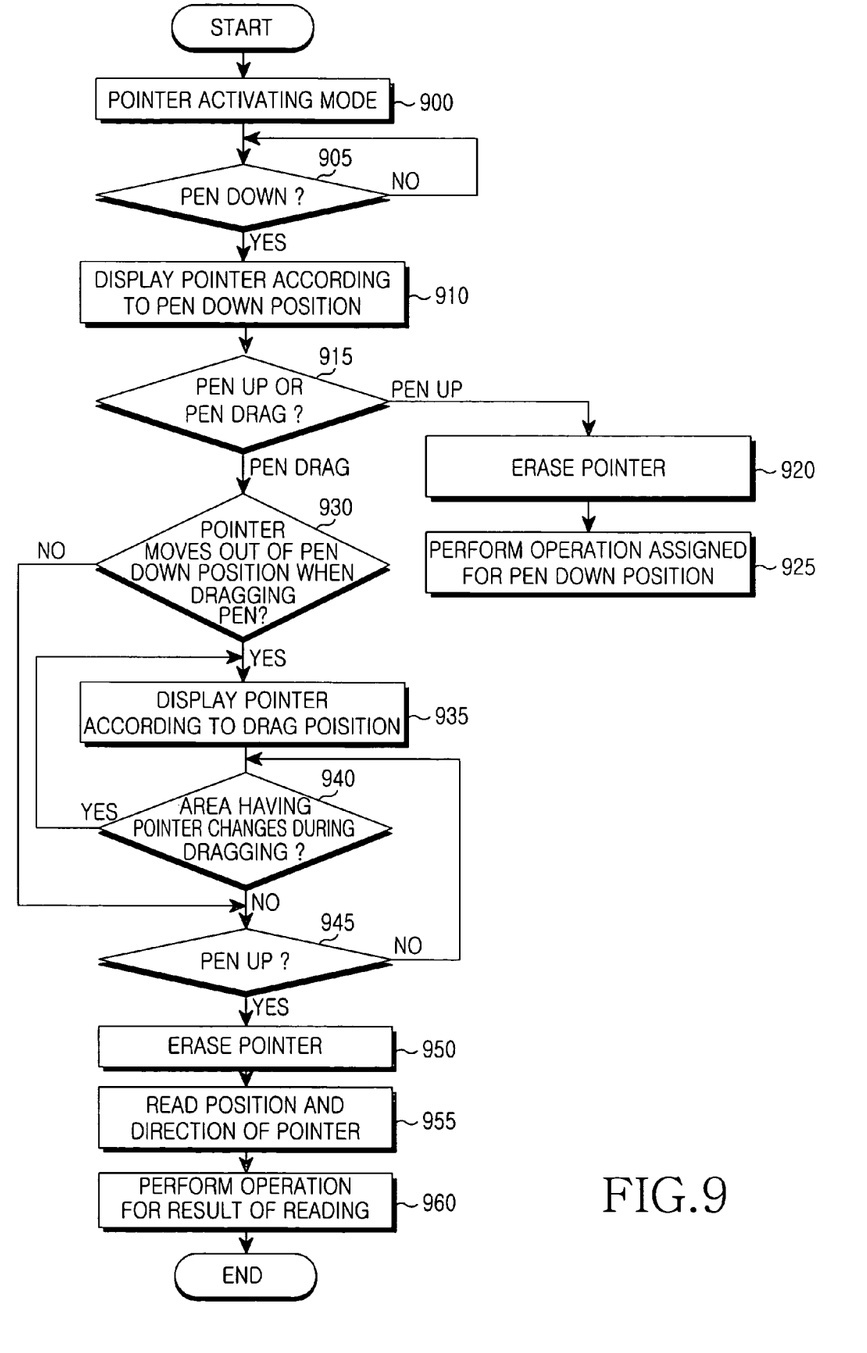
FIG. 9 is a flowchart showing a control procedure when a pointer having an arrow in a fixed direction is used according to still another embodiment of the present invention.

Hereinafter, a procedure for controlling a pointer when utilizing the pointer will be described with reference to FIGS. 4 and 9 according to still another embodiment of the present invention.

First, the control part 200 maintains a waiting mode until a pen-stroke input, that is, a finger touch input is achieved by a user if a pointer activating mode is selected in step 900. Then, the control part 200, which is in the pointer-activating mode, detects whether an input of a user is achieved through the touch screen in step 905. That is, the control part 200 determines whether a pen-down operation is achieved by a user. If the pen-down operation is achieved by a user, the control part 200 recognizes that the pen-down operation is achieved in order to display a pointer on a pen-down position at which the pen-down operation is achieved in step 910. Herein, the pointer displayed on a screen is a pointer having an arrow indicating a direction according to an area corresponding to the position at which the pen-down operation is achieved.

For example, if the position at which the pen-down operation is achieved is the center square area 445, the control part 200 displays a basic pointer on the position at which the pen-down operation is achieved. Also, if the position at which the pen-down operation is achieved is in any one of corner square areas 450, 455, 460, and 465, the control part 200 displays a pointer having an arrow indicating a corresponding corner direction on the position at which the pen-down operation is achieved. Also, if the position at which the pen-down operation is achieved is the remaining areas except for the center square area 445 and each of the corner square areas 450, 455, 460, and 465, the control part 200 displays a pointer having an arrow indicating a side direction on the position at which the pen-down operation is achieved.

Thereafter, the control part 200 determines whether a user performs a pen-up operation, that is, the user takes the finger off a touch part of a pointer upon touching the finger to the touch part of the pointer displayed on the pen-down position in step 915. Also, the control part 200 determines whether a user performs a pen-drag operation while touching the user's finger to the touch part of the pointer. If the user performs the pen-up operation right after the pen-down operation, the control part 200 removes the pointer displayed at the moment that the pen-down operation is achieved from a screen and reads a position and an arrow direction of the pointer displayed by performing step 920. Then, the control part 200 performs an operation assigned for an item indicated by the pointer displayed on the pen-down position by performing step 925.

If a user performs the pen-drag operation while touching the finger to the touch part of the pointer in step 915, the control part 200 determines whether a pointer has moved out of an area corresponding to the pen-down position when a user performs the pen-drag operation in step 930. If the pointer has moved out of an area corresponding to the pen-down position when a user performs the pen-drag operation, the control part 200 detects an area corresponding to a pen-drag position at which the pen-drag operation is achieved in step 935 so as to display a pointer according to the area. For example, when a user drags a pointer displayed on the center square area at which the pen-down operation is first achieved by the user, if the dragged pointer moves out of the center square area and enters into a corner square area or the remaining areas, the control part 200 changes the currently-dragged pointer into a pointer according to an area into which the currently-dragged pointer enters so as to display the pointer according to the area. If the dragged pointer exists in the corresponding area, the control part 200 determines whether the pen-up operation for selecting an item is achieved by a user in step 945.

As described above, the control part 200 detects a pen-drag state performed by a user when a pointer is displayed in a corresponding area according to a position of the user's finger. Herein, the control part 200 determines whether an area at which a pointer is positioned is changed again when dragging the pointer in step 940 in order to change the pointer into a new pointer according to a corresponding area at which the dragged pointer is positioned. If an area at which a pointer is positioned is continuously changed when dragging the pointer, the control part 200 returns to step 935 and displays a new pointer according to an area corresponding to the pen-drag position.

If an area at which a pointer is positioned is not changed when dragging the pointer, in step 945 the control part 200 determines whether the pen-up operation is achieved by a user. If the pen-up operation has been achieved, that is, the user puts the finger off a touch part of the pointer, in step 950 the control part 200 removes the pointer, which has been displayed, from a screen upon detecting the pen-up operation. Herein, the control part 200 regards the pen-up operation achieved by a user as an operation for selecting an item so as to read a position and an arrow direction of a pointer finally displayed in step 955. Thereafter, the control part 200 carries out an operation corresponding to a result of the reading in step 960. For example, if an item indicated by a pointer exists, the control part 200 performs an operation assigned for the item when the pen-up operation for selecting the item is achieved by a user.

As describe above, according to the present invention, it is possible to select an intended item by accurately pointing to the intended item by means of a pointer displayed on a screen if a pointer activating mode for displaying a pointer pointing to an item is selected by a user. Accordingly, if the user inputs the letter, it is possible to reduce an input error by allowing a user to accurately input letters, etc. Also, according to the present invention, it is possible to meet various requirements of a user by providing pointers having various shapes.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but is defined by the appended claims and equivalents thereof.

What is claimed is:

1. A pointing device used in a terminal having a touch screen, the pointing device comprising:

a control part for displaying a pointer on the touch screen when a pointer activating mode for displaying the pointer is selected by a user, wherein the pointer includes a means for pointing that is provided outside of a part touched by the user, the means for pointing indicating an item for being selected by the user when the user touches the part within a predetermined distance from the item on the touch screen; and a user interface for providing an input signal to the control part when the user selects the item on the touch screen using the pointer, wherein the control part is operated based on an item pointed by the pointer if the control part receives a signal selected from the user interface, and wherein the means for pointing comprises an arrow indicating a predetermined direction for pointing to the item and the control part changes a direction indicated by the arrow of the means for pointing such that the arrow points toward a corner of the touch screen based on which corner area at which the pointer is positioned in the touch screen, when the user drags the pointer.

2. The pointing device as claimed in claim 1, wherein the terminal comprises a display part for displaying items and for displaying various mark data based on a pointing input, which is inputted through the user interface.

3. The pointing device as claimed in claim 1, wherein the item is selected from one of a letter, an icon, a scroller, a checkbox, and a slider.

4. The pointing device as claimed in claim 1, wherein the item is a selectable object, which is displayed on the touch screen.

5. The pointing device as claimed in claim 1 further comprising a memory for storing pointers having various shapes and a plurality of pointers having arrows indicating mutually different directions.

6. The pointing device as claimed in claim 1, wherein the control part maintains a direction indicated by the arrow of the means for pointing if an area at which the pointer is positioned is a first area when a user drags the pointer.

7. The pointing device as claimed in claim 6, wherein the first area allows the means for pointing having an arrow indicating a predetermined direction to carry out accurate pointing with respect to the first area.

8. The pointing device as claimed in claim 7, wherein the control part changes a direction indicated by the arrow of the means for pointing if an area at which the pointer is positioned is not the first area when a user drags the pointer.

9. The pointing device as claimed in claim 8, wherein the first area is a square area having a predetermined size and positioned at a center of the touch screen, and the control part changes a direction indicated by the arrow of the means for pointing into a direction corresponding to a corner at which the pointer is positioned if the pointer moves out of the first area and is positioned at any one of corner areas formed between edges of the touch screen and the square area having a predetermined size when a user drags the pointer.

10. A method for utilizing a pointing device used in a terminal having a touch screen, the method comprising:
  i) displaying a pointer on the touch screen if a pointer activating mode for displaying the pointer is selected by a user, wherein the pointer includes a means for pointing that is provided outside of a part touched by the user;
  ii) indicating an item for being selected by the user when the user touches the part within a predetermined distance from the item on the touch screen through use of the means for pointing;
  iii) providing an input signal to the pointing device when the user selects the item on the touch screen through use of the pointer; and
  iv) performing an operation according to the item pointed by the pointer if the user selects the item by means of the pointer,
  wherein the means for pointing comprises an arrow indicating a predetermined direction in order to point to an item and a direction indicated by the arrow of the means for pointing is changed such that the arrow points toward a corner of the touch screen based on a corner area of the touch screen in which the pointer is positioned and displayed, when the user drags the pointer.

11. The method as claimed in claim 10, wherein the item is selected from one of a letter, an icon, a scroller, a checkbox, and a slider.

12. The method as claimed in claim 10, wherein the item is a selectable object, which is displayed.

13. The method as claimed in claim 10, wherein the direction indicated by the arrow of the means for pointing is maintained if the area at which the pointer is positioned is a first area when the user drag the pointer.

14. The method as claimed in claim 13, wherein the first area allows the means for pointing having an arrow indicating a predetermined direction to perform accurate pointing with respect to the first area.

15. The method as claimed in claim 14, wherein the first area is a square area having a predetermined size, positioned at a center of the touch screen, and a direction indicated by the arrow of the means for pointing is changed into a direction corresponding to a corner at which the pointer is positioned if the pointer moves out of the first area and is positioned at any one of corner areas between the touch screen and the square area having a predetermined size when a user drags the pointer.

16. A pointing device used in a terminal having a touch screen, the pointing device comprising:
  a control part for displaying a pointer pointing to an item on the touch screen according to input of a user, wherein the pointer includes a means for pointing that is provided outside of a part touched by the user, the means for pointing indicating an item for being selected by the user when the user touches the part within a predetermined distance from the item on the touch screen; and
  a user interface for outputting an input signal to the control part when an input is provided from the user using the pointer,
  wherein the control part carries out an operation according to the item selected by the pointer if the control part receives the input signal from the user interface, and
  wherein the means for pointing comprises an arrow indicating a predetermined direction in order to point to the item and the control part changes a direction indicated by the arrow such that the arrow points toward a corner of the touch screen based on a corner area of the touch screen in which the pointer is positioned, when the pointer is dragged.

17. The pointing device as claimed in claim 16, wherein the item is a selectable object, which is displayed.

18. The pointing device as claimed in claim 16, wherein the pointer is not displayed by the control part when a pen-up operation for the pointer is performed.

19. A method for utilizing a pointing device used in a terminal having a touch screen, the method comprising:
  i) displaying a pointer pointing to an item on the touch screen according to input of a user, wherein the pointer includes a means for pointing that is provided outside of a part touched by the user;
  ii) indicating an item for being selected by the user when the user touches the part within a predetermined distance from the item on the touch screen through use of the means for pointing;
  iii) providing an input signal to the pointing device when the user selects the item on the touch screen through use of the pointer; and
  iv) performing an operation according to the item selected by the pointer if a pen stroke input is inputted from the user using the pointer,
  wherein the means for pointing comprises an arrow indicating a predetermined direction in order to point to the item and a direction indicated by the arrow of the means for pointing is changed such that the arrow points toward a corner of the touch screen based on a corner area of the touch screen in which the pointer is positioned, when the user drags the pointer.

20. The method as claimed in claim 19, wherein the item is a selectable object, which is displayed.

21. The pointing device as claimed in claim 1, wherein the user touches the part within the predetermined distance from the item on the touch screen by moving the pointer.

22. The method as claimed in claim 10, wherein the user touches the part within the predetermined distance from the item on the touch screen by moving the pointer.

23. The pointing device as claimed in claim 16, wherein the user selects the item by moving the pointer.

24. The method as claimed in claim 19, wherein the user touches the part within the predetermined distance from the item on the touch screen by moving pointer.

* * * * *